(12) United States Patent
Green et al.

(10) Patent No.: US 9,919,582 B2
(45) Date of Patent: Mar. 20, 2018

(54) HUMIDITY ESTIMATION

(71) Applicant: Ford Global Technologies, LLC, Dearborn, MI (US)

(72) Inventors: Alfred Green, Belleville, MI (US); David Karl Bidner, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/006,447

(22) Filed: Jan. 26, 2016

(65) Prior Publication Data
US 2017/0210201 A1 Jul. 27, 2017

(51) Int. Cl.
| B60H 1/00 | (2006.01) |
| B60R 16/037 | (2006.01) |
| B62D 15/02 | (2006.01) |
| F02D 9/08 | (2006.01) |
| F02P 5/04 | (2006.01) |
| G01S 13/02 | (2006.01) |
| G01S 7/52 | (2006.01) |
| G01S 13/86 | (2006.01) |
| G01S 13/93 | (2006.01) |
| G01S 15/08 | (2006.01) |
| G01S 15/87 | (2006.01) |
| G01S 13/89 | (2006.01) |

(52) U.S. Cl.
CPC ....... *B60H 1/00785* (2013.01); *B60R 16/037* (2013.01); *B62D 15/025* (2013.01); *F02D 9/08* (2013.01); *F02P 5/04* (2013.01); *G01S 7/52004* (2013.01); *G01S 13/02* (2013.01); *G01S 13/86* (2013.01); *G01S 13/931* (2013.01); *G01S 15/08* (2013.01); *G01S 15/876* (2013.01); *G01S 13/89* (2013.01); *G01S 2013/9382* (2013.01)

(58) Field of Classification Search
None
See application file for complete search history.

(56) References Cited

U.S. PATENT DOCUMENTS

| 8,652,552 | B2 | 2/2014 | Argudayev et al. |
| 8,656,781 | B2 | 2/2014 | Lavoie |
| 2005/0076704 | A1* | 4/2005 | Wu .................. G01N 15/06 73/24.03 |

(Continued)

FOREIGN PATENT DOCUMENTS

| CN | 203965387 U | 11/2014 |
| CN | 104181229 A | 12/2014 |

(Continued)

OTHER PUBLICATIONS

GB Search Report dated Jun. 6, 2017.

*Primary Examiner* — James M McPherson
(74) *Attorney, Agent, or Firm* — Frank A. MacKenzie

(57) ABSTRACT

A computing device determines that a first time for a first sound generated by a vehicle to reach a first sound maximum amplitude and a second time for a second sound generated by the vehicle to reach a second sound maximum amplitude are within a range. An object that reflects the second sound is identified based on an interval between receipt of the first and second sounds. A speed of sound is determined based at least in part on the time interval and a distance to the object. A humidity is determined based at least in part on the speed of sound. A vehicle subsystem is adjusted based on the humidity.

13 Claims, 4 Drawing Sheets

(56) References Cited

U.S. PATENT DOCUMENTS

2009/0260422 A1* 10/2009 Sugiura .................... G01S 7/52
                                                    73/24.04
2016/0299014 A1    10/2016 Li et al.
2017/0003176 A1*  1/2017 Phan Le ............... G01S 15/885

FOREIGN PATENT DOCUMENTS

| DE | 19902304 A1 | 7/2000  |
|----|-------------|---------|
| GB | 2266369 A   | 10/1993 |
| JP | 5166991 B2  | 3/2013  |

* cited by examiner

HUMIDITY ESTIMATION

BACKGROUND

Ambient humidity may affect various vehicle components. Measuring humidity directly typically requires a dedicated humidity sensor, which may be costly.

BRIEF SUMMARY

A system includes a computer including a processor and a memory, the memory storing instructions executable by the computer to determine that a first time for a first sound generated by a vehicle to reach a first sound maximum amplitude and a second time for a second sound generated by the vehicle to reach a second sound maximum amplitude are within a time range identify the existence of an object that reflects the second sound within a distance range from the vehicle based on a time interval occurring between receipt of the first and second sounds, determine a speed of sound based at least in part on the time interval and a distance to the object, determine a humidity based at least in part on the speed of sound, and adjust a vehicle subsystem based on the humidity.

The instructions can further include instructions to identify objects within a distance range from the vehicle determined based on an ambient temperature and speeds of sound at no humidity and at maximum humidity. The instructions can further include instructions to identify the object with a radar.

The vehicle subsystem can be a climate control subsystem.

The instructions can further include instructions to identify exactly one object and to determine the humidity only when exactly one object is identified. The instructions can include instructions to receive the first sound from a vehicle tire. The instructions can include instructions to send an instruction to a spark timing subsystem to adjust a spark timing based on the humidity.

A system includes a computer including a processor and a memory, the memory storing instructions executable by the computer to identify a start notification from a vehicle suspension subsystem, receive a sound generated by the vehicle after receipt of the start notification, identify an object that reflects the sound from a vehicle tire to a vehicle based on a time interval between the start notification and the receipt of the sound, determine a speed of sound based at least in part on the time interval, determine a humidity based at least in part on the speed of sound, and adjust a vehicle subsystem based on the humidity.

The instructions can further include instructions to identify objects within a distance range from the vehicle determined based on an ambient temperature and speeds of sound at no humidity and at maximum humidity. The instructions can further include instructions to identify the object with a radar.

The vehicle subsystem can be a climate control subsystem.

The instructions can further include instructions to identify exactly one object and to determine the humidity only when exactly one object is identified. The instructions can include instructions to receive the first sound from a vehicle tire. The instructions can include instructions to send an instruction to a spark timing subsystem to adjust a spark timing based on the humidity.

A method includes determining that a first time for a first sound generated by a vehicle to reach a first sound maximum amplitude and a second time for a second sound generated by the vehicle to reach a second sound maximum amplitude are within a time range, identifying the existence of an object that reflects the second sound within a distance range from the vehicle based on a time interval occurring between receipt of the first and second sounds, determining a speed of sound based at least in part on the time interval and a distance to the object, determining a humidity based at least in part on the speed of sound, and adjusting a vehicle subsystem based on the humidity.

The method can further include identifying objects within a distance range from the vehicle, the distance range based on an ambient temperature and speeds of sound at no humidity and at maximum humidity. The method can further include identifying exactly one object and to determine the humidity only when exactly one object is identified.

In the method, the vehicle subsystem can be a climate control subsystem.

The method can further include adjusting a spark timing with a spark timing subsystem based on the humidity. The method can further include identifying the object with a radar.

DETAILED DESCRIPTION

Estimating an ambient humidity based on a measured speed of sound provides a cost-effective way to adjust humidity-dependent vehicle subsystems. A microphone may record a sound from a vehicle tire striking an uneven part of a road, e.g., rumble strips, a pothole, etc. The microphone may then record a reflection of the sound off of a nearby object, e.g., a traffic sign, a street lamp, a telephone pole, etc. The vehicle may determine the difference in time, i.e., a time of flight, between receiving the sound and the reflection of the sound. A radar may determine the distance from the vehicle to the object. Based on the time of flight and distance from the vehicle to the object, the vehicle may determine a speed of sound, i.e., the speed of propagation of acoustic waves in the surrounding air at the ambient humidity. Because the speed of sound in air is a function of ambient humidity, as is known, the vehicle may determine the ambient humidity based on the speed of sound by, e.g., referring to a known psychrometric chart. Based on this estimated humidity, vehicle subsystems may be adjusted, e.g., a climate control system may adjust a dehumidifier based on the estimated humidity.

Figure 1:
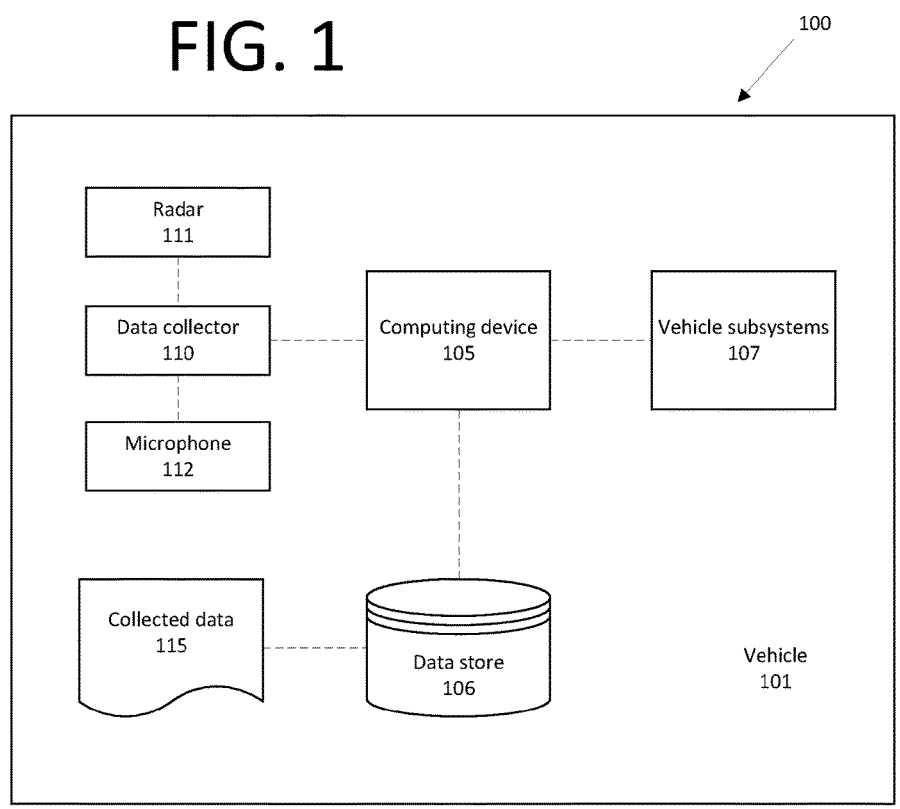
FIG. 1 is a block diagram of a vehicle system for estimating humidity.

FIG. 1 illustrates an example system 100 for estimating an ambient humidity and adjusting a vehicle subsystem based on the estimated humidity. A computing device 105 is programmed to receive collected data 115 from one or more data collectors 110, e.g., vehicle 101 sensors, concerning various metrics related to the vehicle 101. For example, the metrics may include a velocity of the vehicle 101, vehicle 101 acceleration and/or deceleration, data related to vehicle 101 path or steering, etc., including lateral acceleration, curvature of the road, distance to an object, sound from a vehicle tire during an impact event, etc. Further examples of such metrics may include measurements of vehicle 101 systems and components (e.g. a steering system, a powertrain system, a brake system, internal sensing, external sensing, etc.). The computing device 105 may be programmed to collect data 115 from the vehicle 101 in which it is installed, sometimes referred to as a "host vehicle", and/or may be programmed to collect data 115 about and/or from, e.g., via DSRC communications or the like, a second vehicle, i.e., a vehicle other than the vehicle 101, e.g., a "target vehicle". Additionally, it is possible that the computer 105 receives data from a remote server, e.g., via a cellular or other wireless network.

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid-state drives, servers, or any volatile or non-volatile media. The data store 106 may store the collected data 115 sent from the data collectors 110.

The vehicle 101 may include a plurality of subsystems 107. The subsystems 107 include, e.g., a propulsion subsystem (e.g. throttle), an entertainment subsystem, a steering subsystem, a spark timing subsystem, a climate control subsystem, etc. The subsystems 107 may be electronic control units (ECU), as are known, that control various components of the vehicle 101, e.g., the spark timing subsystem may be an engine control unit that may receive instructions to adjust the spark timing based on the estimated humidity.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, etc., of any number of vehicles 101, including the host vehicle and/or the target vehicle. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to determine environmental data, e.g., to measure a distance between the vehicle 101 and other vehicles or objects, the kinds of objects near the trajectory of the vehicle 101, the road conditions, locations of roads and traffic signs, etc. Yet other data collectors 110 could include cameras, breathalyzers, motion detectors, etc., i.e., data collectors 110 to provide data 115 for evaluating a condition or state of a vehicle 101 operator.

Collected data 115 may include a variety of data collected in a vehicle 101. Examples of collected data 115 are provided above, and moreover, data 115 is generally collected using one or more data collectors 110, and may additionally include data calculated therefrom in the computer 105. In general, collected data 115 may include any data that may be gathered by the data collectors 110 and/or computed from such data. The data 115 may include biometric data from the human operator, e.g., pulse, blood pressure, breathing rate, etc.

Figure 2:
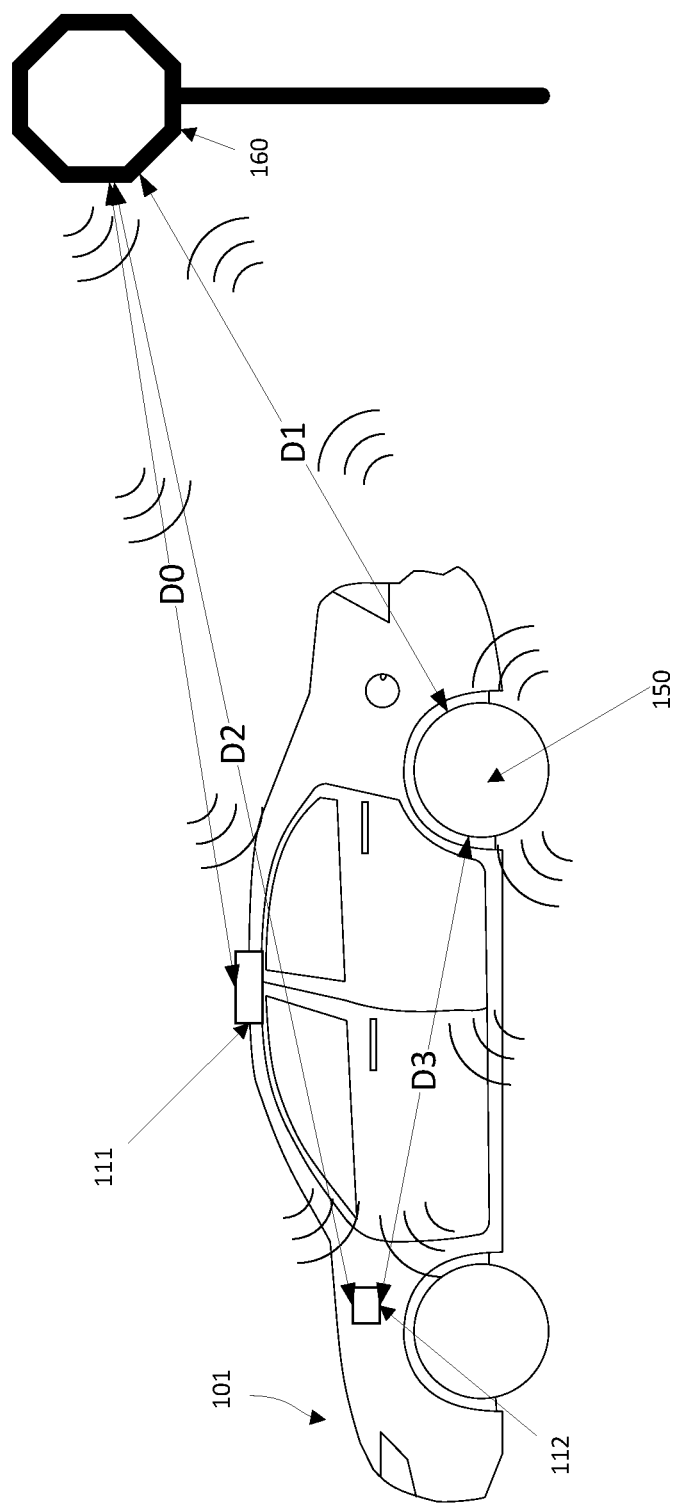
FIG. 2 is an example illustration of a vehicle including the system of FIG. 1 using an object for humidity estimation.

FIG. 2 illustrates the vehicle 101. The vehicle 101 may include a radar 111 and a microphone 112. The radar 111 is a data collector 110, as is known, that sends and receives radio waves to determine a distance of an object. The microphone 112 is a data collector 110, as is known, that detects acoustic waves, i.e sounds. While in this example the vehicle 101 includes the radar 111 and the microphone 112, the vehicle 101 may include any number and/or type of data collectors 110 necessary to determine the estimated humidity.

The vehicle 101 may include a tire 150. The tire 150 may contact a road, generating a sound. For example, on a smooth road, the tire 150 may generate only a consistent, low-amplitude sound. In another example, when the tire 150 hits a pothole, the tire 150 may generate a short, high-amplitude sound. In yet another example, when the tire 150 rolls over rumble strips, the tire 150 may generate a periodic rumbling sound.

FIG. 2 further illustrates an object 160. The object 160 reflects sound generated by the tire 150 back to the vehicle 101, where the sound is received by the microphone 112. The radar 111 may detect several objects 160, including a distance from the vehicle 101 to the objects 160. The object 160 may be, e.g., a traffic sign, a telephone pole, a street lamp, etc.

The radar 111 may determine the location of several vehicle components and objects and the distance between the components and the objects. As shown in FIG. 2, the radar 111 may determine a distance D0 from the radar 111 to a nearby object 160. Similarly, the radar 111 may determine a distance D1 from the tire 150 to the object 160, the distance D2 from the object 160 to the microphone 112, and the distance D3 from the tire 150 to the microphone 112. The distances D0, D1, D2, D3 may represent the path that a sound may travel through the surrounding air, i.e., a flight path, for a sound traveling between the tire 150, the object 160, the radar 111, and the microphone 112.

Figure 3:
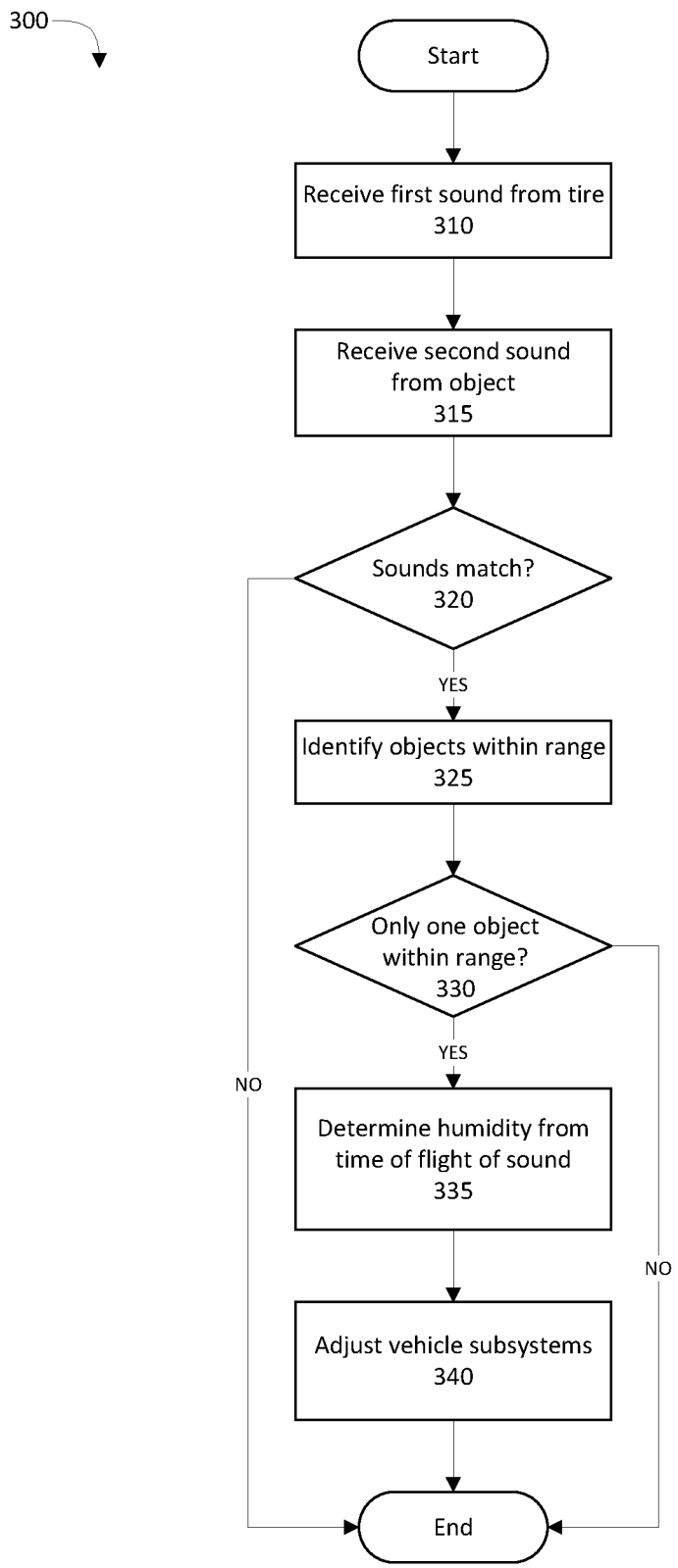
FIG. 3 is an example process for determining a humidity based on a measured speed of sound in air.

FIG. 3 illustrates a process 300 for actuating a vehicle subsystem 107 based on estimated humidity. The process 300 begins in a block 310, where a microphone 112 collects a first sound from the vehicle tire 150. Here, the first sound is a set of acoustic waves generated from the vehicle tire 150 interacting with the road that reaches the microphone 112 The first sound may come from the vehicle tire 150 contacting, e.g., an uneven patch of a road, a pothole, a rumble strip, etc. The microphone 112 (i.e., a processor included therein) may be programmed to recognize sounds that include acoustic waves at frequencies known to be included in sounds generated by the vehicle tire 150, and to identify the first sound according to a set of acoustic waves received in the range of the known frequencies.

Next, in a block 315, the microphone 112 collects a second sound reflected by an object 160. Here, the second sound is a next set of acoustic waves received by the microphone 112 after receipt of the first sound, as described above. The microphone 112 may detect a plurality of sounds after detecting the first sound, and may determine the second sound as the next sound according to the range of the known frequencies for sounds generated by the vehicle tire 150, as described above, that is received by the microphone 112. The second sound may be the reflection of the first sound by the object 12 near the vehicle 101. The computing device determines a time interval between receipt of the first sound and receipt of the second sound, the time interval representing a time of $t_f$ flight for the second sound to travel from the tire 150, reflect off the object 160, and return to the microphone 112. The time of flight may be determined as the time difference between receipt of the first and second sounds, or may include an estimated time of flight of the first sound from the tire 150 to the microphone 112 over the distance D3.

Next, in a block 320, the computing device 105 compares the first sound to the second sound and determines if the two sounds match, i.e., if the second sound is a reflection of the first sound by an object. The first sound has a characteristic rise time, i.e., the time for the first sound to reach its maximum amplitude, substantially unique to the first sound because the characteristic rise time is a result of at least some of the tire 150 pressure, wheel size, size of the obstruction striking the tire 150 that produced the first sound, the vehicle 101 suspension spring rate, and/or the vehicle 101 damper condition and mass. The characteristic rise time may be measured by the data collectors 110 in a known manner, e.g., measuring peak values of the amplitude, i.e., local maxima of amplitude of a sound over time, and the time stamps of those peak values, comparing a fast Fourier transform (FFT) over the length of several cycles in an audible range of frequencies, e.g., 20 Hz-20 kHz, etc. If the characteristic rise time of the first sound is within a predetermined range of the characteristic rise time of the second sound, then the computing device 105 determines that the first sound matches the second sound. The predetermined range is a range of values for the characteristic rise time that the computing device 105 compares to the difference in rise times between the first sound and the second sound. If first and second sounds are within the range, then the computing device 105 determines that the first sound matches the second sound. That is, the computing device 105 determines that the second sound is the first sound reflected off of the object 160. If the first and second sounds match, the process 300 continues in a block 325; otherwise, the process 300 ends. The computing device 105 may also be programmed to recognize specific sounds, e.g., the sound of the tire 150 hitting rumble strips or a pothole.

In the block 325, the computing device searches for objects 160 within a distance range of the vehicle 101. The distance range may be determined by taking the time interval between receipt of the first and second sounds and estimating a speed of sound based on an ambient temperature, a lower bound for the distance range based on the speed of sound based on no humidity and an upper bound for the distance range based on maximum humidity. The time interval indicates a time of flight for the second sound to travel from the tire 150 to the vehicle 101 reflecting off the object 160. Because the speed of sound is faster when humidity is higher, i.e. closer to the maximum humidity at a given temperature, for a given time interval, a higher humidity would result in an object 160 farther away reflecting the second sound than an object 160 would be at a lower humidity. Because the humidity of air at a given ambient temperature is limited to a known range, the possible distance range where the object 160 may lie may be determined based on the known humidity range, the ambient temperature, and the time interval. For example, if the ambient temperature is 20° C., the speed of sound in air is 343.4 meters per second (m/s) at 0% humidity and 344.6 m/s at 90% humidity. The speed of sound at no humidity, $v_{s,dry}$, and the speed of sound at maximum humidity, $v_{s,wet}$, are known for a given temperature. With these speeds of sound and the time of flight $t_f$, the distance range may be determined as:

$$\text{distance range} = [v_{s,dry} \cdot t_f, v_{s,wet} \cdot t_f]$$

The radar 111 may search for objects within the distance range of the vehicle 101 that could reflect the second sound back to the vehicle 101. Such objects 160 may include, e.g., traffic signs, telephone poles, streetlamps, etc. The radar 111 store data, e.g., estimated locations and dimensions, of objects 160 in the distance range and store them in the data store 106.

Next, in the block 330, the computing device 105 determines whether there is exactly one object 160 in the distance range. If there are multiple objects 160 in the distance range, then multiple values for the humidity may be determined based on the distance of the objects 160 to the vehicle 101. Respective vehicle subsystems 107 may be adjusted differently based on different estimated values of humidity, so a single estimated value of humidity may be desirable. Thus, the process 300 continues only if there is exactly one object 160, and thus one estimated value for the humidity, in the distance range. If there is exactly one object 160 in the distance range, the process 300 continues in a block 335; otherwise, the process 300 ends.

In the block 335, the computing device 105 estimates the humidity from the distance of the object 160 to the vehicle 101, the ambient temperature, and the time of flight of the second sound. The speed of sound in air is a function, at least in part as is known, of ambient temperature and humidity. A speed of sound may be measured based on the time of flight of the second sound and the distance to the object 160. For example, as shown in FIG. 2, the distance D1 represents a distance from the tire 150 to the object 160, and the distance D0 represents a distance from the object 160 to the radar 111, the distances D0, D1 being detected, for example, by the radar 111. While the example of FIG. 2 illustrates the distances D0, D1, D2, D3 aligned in a plane, the distances may be determined in 3-dimensional space, and thus the distances may be represented as vectors, as is known. As described above, the distance D2 represents the distance from the object 160 to the microphone 112. Because the distance between the radar 111 and the microphone 112 is known, the distance D2 is simply the vector representing the distance from the object 160 to the radar 111 D0 added to the vector representing the distance from the radar 111 to the microphone 112 using known vector addition techniques. The time of flight $t_f$ of the second sound may be determined by the time interval between receipt of the first sound and receipt of the second sound, as described above. Thus, the speed of sound $v_s$ may be estimated by:

$$v_s = \frac{D1 + D2}{t_f}$$

With the speed of sound and measured ambient temperature, the adiabatic constant of the ambient air may be determined as:

$$v_s = \sqrt{\gamma R T}$$

where γ is the adiabatic constant of air (also known as the ratio of specific heats), R is the universal gas constant, and T is the ambient temperature. The adiabatic constant γ is a function of humidity, as is known, and thus the estimated humidity may be determined based on the adiabatic constant, e.g., found in a psychrometric chart stored in the data store 106.

The computing device 105 may determine the estimated humidity using known psychrometric equations for the speed of sound. For example, the speed of sound in air with no humidity $v_{s,dry}$ and air with maximum humidity $v_{s,wet}$ may be defined as:

$$v_{s,dry} = \sqrt{\gamma_{dry} \cdot \frac{P}{\rho_{dry}}}$$

$$v_{s,wet} = \sqrt{\gamma_{wet} \cdot \frac{P}{\rho_{wet}}}$$

where $\gamma_{dry}$, $\gamma_{wet}$ are the adiabatic constants for air at no humidity and maximum humidity, respectively, as are known, P is the absolute pressure, measured by a data collector 110, and $\rho_{dry}$, $\rho_{wet}$ are the densities of air at no humidity and maximum humidity, respectively, as are known. The adiabatic constants and densities are, in general, functions of humidity.

With the speeds of sound for no humidity, maximum humidity, and measured based off of the second sound, an absolute humidity ratio AHR may be determined as $$AHR = \frac{v_{s,wet} - v_s}{(v_{s,wet} - v_{s,dry})^2}$$

With the absolute humidity ratio AHR and measured ambient temperature, the estimated humidity may be determined using a psychrometric chart, as is known. The psychrometric chart may be stored in the data store 106, as mentioned above.

Next, in a block 340, the computing device 105 sends instructions to adjust vehicle subsystems 107 based on the estimated humidity, and the process 300 ends. For example, a spark timing subsystem 107 may receive an instruction to delay spark timing based on a higher estimated humidity. In another example, a climate control subsystem 107 may receive an instruction to adjust operation of a dehumidifier, a heater, and/or an air conditioner based on the estimated humidity. In yet another example, the climate control subsystem 107 may adjust a windshield defroster based on the humidity. In another example, a fuel injector subsystem 107 may adjust an air/fuel ratio of an intake charge into the engine cylinders.

Figure 4:
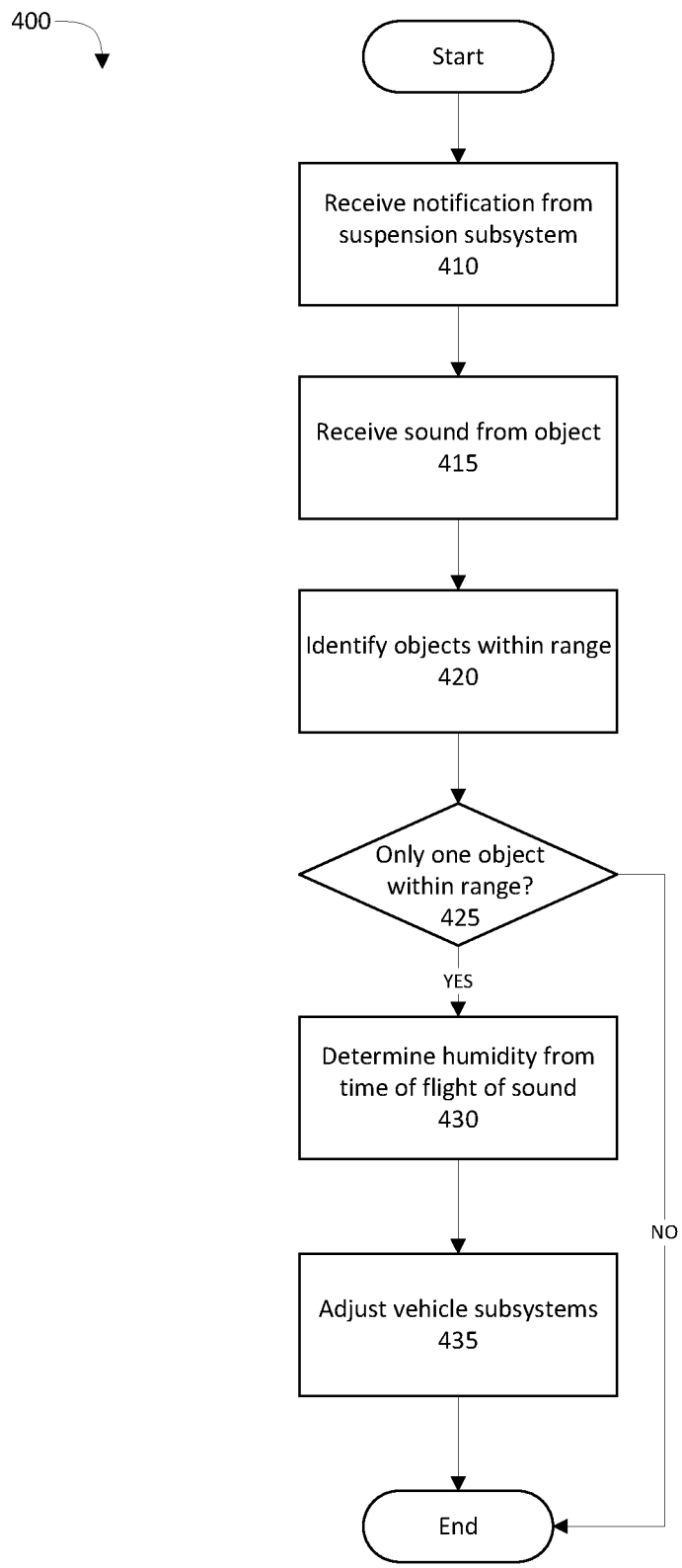
FIG. 4 is another example process for determining a humidity based on a measured speed of sound in air.

FIG. 4 illustrates an exemplary process 400 for actuating a vehicle subsystem 107 based on estimated humidity. The process 400 begins in a block 410, where the computing device 105 receives a start notification from a vehicle suspension subsystem 107. The start notification may be, e.g., an instruction and/or signal sent from the suspension subsystem 107 to the computing device 105 to, e.g., actuate the microphone 112 to receive an incoming sound generated by the tire striking a part of the road. The start notification indicates that the vehicle suspension subsystem 107 has encountered an event in the road, e.g., a pothole, a rumble strip, a rough patch, etc. Rather than receive a first sound as in the process 300, the process 400 starts when the tire 150 experiences the event and the vehicle suspension subsystem 107 sends the notification to the computing device 105.

Next, in a block 415, the microphone 112 receives a sound. The sound is typically like the second sound of the process 300, i.e., it is the sound coming from the tire 150 reflected from an object 60 to the vehicle 101. The computing device 105 may programmed to recognize specific sounds, e.g., the sound of the tire 150 hitting rumble strips or a pothole. The computing device 105 determines a time interval between the receipt of the start notification and the receipt of the sound, the time interval indicating the time of flight of the sound.

Next, in a block 420, the radar 111 detects objects within a distance range of the vehicle 101. As in the process 300, the distance range is determined based on the time interval, the distance to the object 160, the ambient temperature, and the speeds of sound based on no humidity and maximum humidity at the ambient temperature.

Next, in a block 425, the computing device 105 determines whether there is exactly one object 160 within the distance range. As described above, if there are multiple objects 160 in the distance range, then multiple values for the humidity may be estimated based on the distance of the objects 160 to the vehicle 101. If there is exactly one object 160 in the distance range, the process 400 continues in a block 430; otherwise, the process 400 ends. The process 400 may alternatively continue to the block 430 if multiple objects 160 are found but each are within the predetermined distance threshold from each other. The process 400 may yet alternatively continue to the block 430 when the computing device 105, having detected multiple objects 160, selects one of the objects in a known manner.

In the block 430, the computing device 105 the computing device 105 estimates the humidity from the distance of the object 160 to the vehicle 101, the ambient temperature, and the time of flight of the second sound. As described for the block 335 of the process 300, the computing device 105 uses the ambient temperature, time of flight, distance of the object 160, and the psychrometric chart stored in the data store 106 to determine the estimated humidity.

Next, in a block 435, the computing device 105 sends instructions to adjust vehicle subsystems 107 based on the estimated humidity, and the process 400 ends. For example, a spark timing subsystem 107 may receive an instruction to delay spark timing based on a higher estimated humidity. In another example, a climate control subsystem 107 may receive an instruction to adjust operation of a dehumidifier based on the estimated humidity.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
   determine that a first time taken by a first sound generated by a vehicle to reach a first sound maximum amplitude and a second time taken by a second sound generated by the vehicle to reach a second sound maximum amplitude are within a time range;
   identify the existence of an object that reflects the second sound within a distance range from the vehicle based on a time interval occurring between receipt of the first and second sounds;
   determine a speed of sound based at least in part on the time interval and a distance to the object;
   determine a humidity based at least in part on the speed of sound; and adjust a vehicle subsystem based on the humidity.

2. The system of claim 1, wherein the instructions further include instructions to identify objects within a distance range from the vehicle determined based on an ambient temperature and speeds of sound at no humidity and at maximum humidity.

3. The system of claim 1, wherein the instructions further include instructions to identify the object with a radar.

4. The system of claim 1, wherein the vehicle subsystem is a climate control subsystem.

5. The system of claim 1, wherein the instructions further include instructions to identify exactly one object and to determine the humidity only when exactly one objet is identified.

6. The system of claim 1, wherein the instructions include instructions to receive the first sound from a vehicle tire.

7. The system of claim 1, wherein the instructions include instructions to send an instruction to a spark timing subsystem to adjust, a spark timing based on the humidity.

8. A method, comprising:
   determining that a first time taken by a first sound generated by a vehicle to reach a first sound maximum amplitude and a second time taken by a second sound generated by the vehicle to reach a second sound maximum amplitude are within a time range;
   identifying the existence of an object that reflects the second sound within a distance range from the vehicle based on a time interval occurring between receipt of the first and second sounds;
   determining a speed of sound based at least in part on the time interval and a distance to the object;
   determining a humidity based at least in part on the speed of sound; and
   adjusting a vehicle subsystem based on the humidity.

9. The method of claim 8, further comprising identifying objects within a distance range from the vehicle, the distance range based on an ambient temperature and speeds of sound at no humidity and at maximum humidity.

10. The method of claim 8, further comprising identifying exactly one object and to determine the humidity only when exactly one object is identified.

11. The method of claim 8, wherein the vehicle subsystem is a climate control subsystem.

12. The method of claim 8, further comprising adjusting a spark timing with a spark timing subsystem based on the humidity.

13. The method of claim 8, further comprising identifying the object with a radar.

* * * * *

UNITED STATES PATENT AND TRADEMARK OFFICE
CERTIFICATE OF CORRECTION

PATENT NO. : 9,919,582 B2
APPLICATION NO. : 15/006447
DATED : March 20, 2018
INVENTOR(S) : Alfred Green et al.

It is certified that error appears in the above-identified patent and that said Letters Patent is hereby corrected as shown below:

In the Claims

Column 10, Line 3 of Claim 7: Delete the "," after "adjust".

Signed and Sealed this
Twenty-second Day of May, 2018

Andrei Iancu
*Director of the United States Patent and Trademark Office*